United States Patent
White et al.

(10) Patent No.: US 12,363,000 B2
(45) Date of Patent: *Jul. 15, 2025

(54) COMPUTERIZED SYSTEMS AND METHODS FOR ADAPTIVE DEVICE PROTECTION

(71) Applicant: PLUME DESIGN, INC., Palo Alto, CA (US)

(72) Inventors: Paul White, San Carlos, CA (US); Susmita Nayak, Fremont, CA (US); Kyle McGill, San Mateo, CA (US); Naveen Ancha, Milpitas, CA (US); Derek Lownsbrough, Kelowna (CA); Alexey Gadalin, Kirkland, WA (US)

(73) Assignee: PLUME DESIGN, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/541,337

(22) Filed: Dec. 15, 2023

(65) Prior Publication Data

US 2024/0380663 A1  Nov. 14, 2024

Related U.S. Application Data

(63) Continuation of application No. 18/316,701, filed on May 12, 2023, now Pat. No. 11,902,098.

(51) Int. Cl.
*G06F 15/173* (2006.01)
*H04L 9/40* (2022.01)
(Continued)

(52) U.S. Cl.
CPC ...... *H04L 41/0894* (2022.05); *H04L 41/0893* (2013.01); *H04L 63/20* (2013.01)

(58) Field of Classification Search
None
See application file for complete search history.

(56) References Cited

U.S. PATENT DOCUMENTS 5,968,176 A * 10/1999 Nessett ............... H04L 63/0227
726/11
11,082,451 B2   8/2021 Ojha et al.
(Continued)

OTHER PUBLICATIONS

International Search Report and Written Opinion to Int'l Appln. No. PCT/US24/28097, mailed Aug. 7, 2024 (13 pages).

*Primary Examiner* — Phuoc H Nguyen
(74) *Attorney, Agent, or Firm* — Nicolas Martin; Greenberg Traurig, LLP (57) ABSTRACT

Disclosed are systems and methods that provide a computerized device management framework that adaptively determines and applies security and configuration parameters to a device on a first network, and enables the adaptive application of such parameters as the device disconnects and connects to other networks. The disclosed framework enables the automatic detection of different networks being relied upon by the device for access to the Internet, upon which, management control policies of the device's activities can be controlled and managed in a unified manner. Accordingly, the disclosed framework can enable security and configuration mechanisms applied on a first network, upon which they are associated, to be seamlessly applied on another disparate network via a virtual private network connection enabled via proprietary mechanisms implemented on the device.

20 Claims, 6 Drawing Sheets

(51) Int. Cl.
*H04L 41/0893* (2022.01)
*H04L 41/0894* (2022.01)

(56) References Cited

U.S. PATENT DOCUMENTS

| | | | |
|---|---|---|---|
| 11,595,312 | B2 | 2/2023 | Savarese et al. |
| 11,677,788 | B1 * | 6/2023 | Badana ............... H04L 63/1425 |
| | | | 726/1 |
| 11,902,098 | B1 | 2/2024 | White et al. |
| 2001/0037384 | A1 | 11/2001 | Jemes et al. |
| 2004/0221051 | A1 * | 11/2004 | Liong .................... H04L 47/20 |
| | | | 709/230 |
| 2008/0225720 | A1 * | 9/2008 | Khemani ............ H04L 67/1008 |
| | | | 370/235 |
| 2021/0014233 | A1 * | 1/2021 | Kuppannan ......... H04L 63/0209 |
| 2023/0124343 | A1 * | 4/2023 | Garcarz ................. H04L 45/26 |
| | | | 709/223 |

* cited by examiner

COMPUTERIZED SYSTEMS AND METHODS FOR ADAPTIVE DEVICE PROTECTION

CROSS-REFERENCE TO RELATED APPLICATIONS

This application is a continuation of, and claims the benefit of priority from, U.S. Ser. No. 18/316,701, filed on May 12, 2023, which is incorporated in its entirety herein by reference.

FIELD OF THE DISCLOSURE

The present disclosure is generally related to device management, and more particularly, to a decision intelligence (DI)-based computerized framework for deterministically managing and/or controlling device security features agnostic of the network upon which the device is connected.

BACKGROUND

Conventional mechanisms for modern device protection plans act as a firewall to the device thereby protecting the device's data while on unsecured networks. For example, this can provide encryption of user data when the device connects to the Internet or a public location so as to enable the device's Internet Protocol (IP) address and online activity to be hidden.

SUMMARY OF THE DISCLOSURE

To that end, there is, however, no current technical mechanism for application of security policies from one network to be matriculated to another network when a connected device severs the connection from the one network and establishes a connection with the other network.

Accordingly, the disclosed systems and methods provide an improved computerized device management framework that adaptively detects and configures device and/or network parameters and/or protocols to secure the device regardless of which network the device is currently connected to. In some embodiments, the disclosed framework can execute and/or implement a virtual private network (VPN) application, as discussed herein, that can generate and/or facilitate a bridge between differing networks, which can avail the device to the security parameters/protocols associated with a host network.

According to some embodiments, the disclosed policy management may be associated with a network. For example, a user's home network, such as their Wi-Fi network, which can be referenced as a "host" network. In some embodiments, such host network can have security protocols set and/or applied therein, which can control how devices connected to such network can operate and/or which network resources the devices can connect to. For example, user 1's smart phone may have parameters applied via a management policy for the network which limit download speeds, and user 2's tablet device may have protocols applied which prevent certain applications from being accessed. In another non-limiting example, user 2's device may enable access to an application, but prevent certain actions from being performed (e.g., posting/sharing or uploading on Instagram®, for example).

Thus, while the users of the network, and their associated devices, may be protected while connected to the host network, under conventional mechanisms, once the devices connect to another network, the protocols of the host network would be inapplicable. However, via the advent of the disclosed technology, a novel type of VPN connection can be established which can enable the policies of the host network to be effectively applied to the second (or other) network, such that the device's operations can be controlled remotely despite not being connected to the host network.

For example, user 2's device, while connected to a cellular network, can still be subject to a host network's restriction policy as to which applications can be access and/or which actions can be performed, which can be enabled despite the device of user 2 not being connected to the host (Wi-Fi, for example), network.

Accordingly, the disclosed systems and methods enable a "roaming" device protection implementation that effectively integrates to any type of disparate/remote network a device may connect to in order to ensure that "host-enabled" configurations associated with the device's host network can be seamlessly applied. As provided herein, the disclosed framework can provide "home" enabled security and content filtering to any type of network situation a device finds itself operating within.

According to embodiments of the instant disclosure, while the "host" network may be discussed herein as a Wi-Fi network, it should not be construed as limiting, as any type of host or origin network can be configured with an adaptively applied and/or set management policy, such that, upon connection to another or different network, such the host policy (or policies) can be enabled via the disclosed framework's implementation without departing from the scope of the instant disclosure.

According to some embodiments, a method is disclosed for a DI-based computerized framework for deterministically managing and/or controlling device security features agnostic of the network upon which the device is connected. In accordance with some embodiments, the present disclosure provides a non-transitory computer-readable storage medium for carrying out the above-mentioned technical steps of the framework's functionality. The non-transitory computer-readable storage medium has tangibly stored thereon, or tangibly encoded thereon, computer readable instructions that when executed by a device cause at least one processor to perform a method for deterministically managing and/or controlling device security features agnostic of the network upon which the device is connected.

In accordance with one or more embodiments, a system is provided that includes one or more processors and/or computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

DESCRIPTIONS OF THE DRAWINGS

The features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine-readable media, for example. A network may include the Internet, one or more local area networks (LANs), one or more wide area networks (WANs), wire-line type connections, wireless type connections, cellular or any combination thereof. Likewise, sub-networks, which may employ different architectures or may be compliant or compatible with different protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router mesh, or 2nd, 3rd, $4^{th}$ or $5^{th}$ generation (2G, 3G, 4G or 5G) cellular technology, mobile edge computing (MEC), Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or user, entity, subscriber or customer) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device a Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

Figure 1:
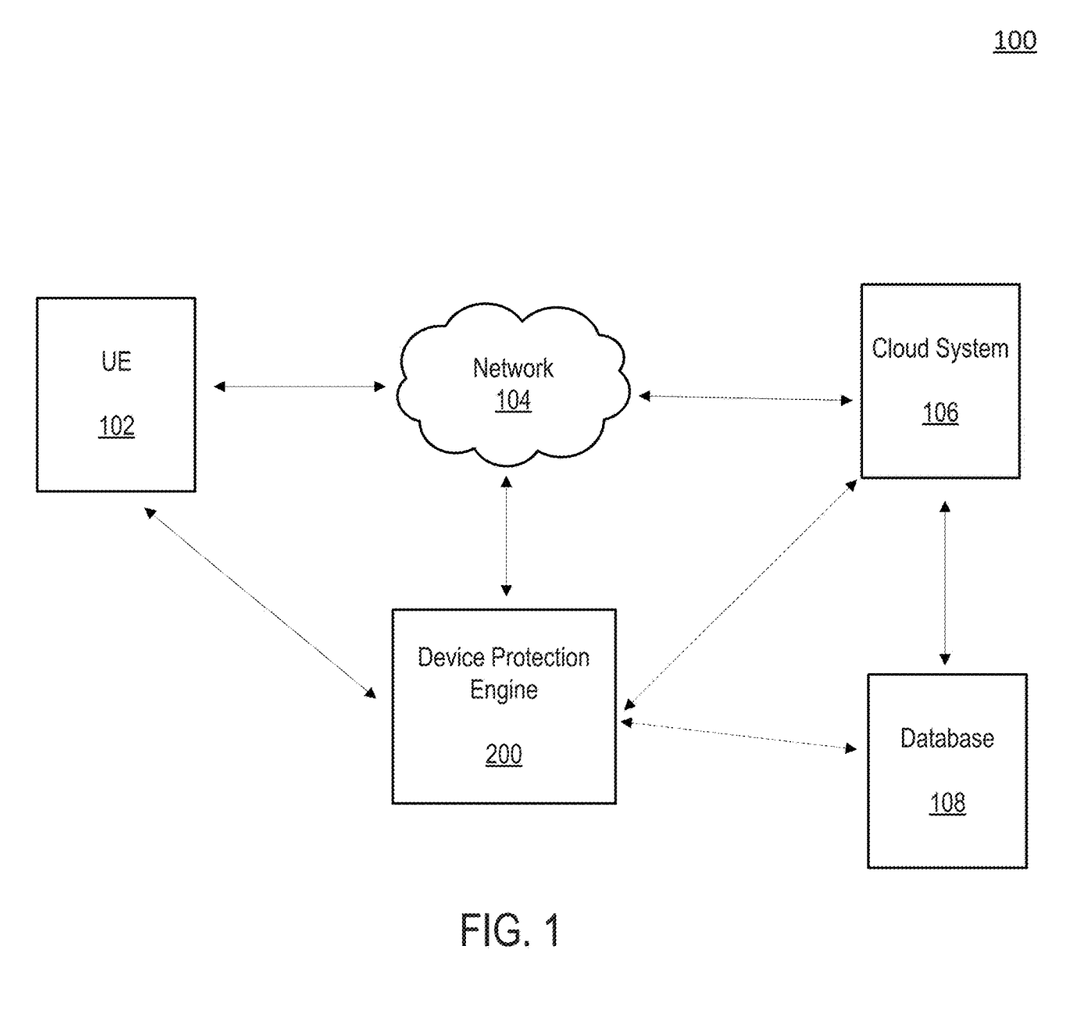
FIG. 1 is a block diagram of an example configuration within which the systems and methods disclosed herein could be implemented according to some embodiments of the present disclosure.

Certain embodiments and principles will be discussed in more detail with reference to the figures. With reference to FIG. 1, system 100 is depicted which includes user equipment (UE) 102 (e.g., a client device, as mentioned above and discussed below in relation to FIG. 6), network 104, cloud system 106, database 108 and device protection engine 200. It should be understood that while system 100 is depicted as including such components, it should not be construed as limiting, as one of ordinary skill in the art would readily understand that varying numbers of UEs, access point devices, peripheral devices, cloud systems, databases and networks can be utilized; however, for purposes of explanation, system 100 is discussed in relation to the example depiction in FIG. 1.

According to some embodiments, UE 102 can be any type of device, such as, but not limited to, a mobile phone, tablet, laptop, sensor, IoT device, autonomous machine, and any other device equipped with a cellular or wireless or wired transceiver.

In some embodiments, a peripheral device (not shown) can be connected to UE 102, and can be any type of peripheral device, such as, but not limited to, a wearable device (e.g., smart watch), printer, speaker, sensor, and the like. In some embodiments, a peripheral device can be any type of device that is connectable to UE 102 via any type of known or to be known pairing mechanism, including, but not limited to, WiFi, Bluetooth™, Bluetooth Low Energy (BLE), NFC, and the like.

In some embodiments, network 104 can be any type of network, such as, but not limited to, a wireless network, cellular network, the Internet, and the like (as discussed above). Network 104 facilitates connectivity of the components of system 100, as illustrated in FIG. 1.

According to some embodiments, cloud system 106 may be any type of cloud operating platform and/or network based system upon which applications, operations, and/or other forms of network resources may be located. For example, system 106 may be a service provider and/or network provider from where services and/or applications may be accessed, sourced or executed from. For example, system 106 can represent the cloud-based architecture associated with a smart home or network provider, which has associated network resources hosted on the internet or private network (e.g., network 104), which enables (via engine 200) the device management discussed herein.

In some embodiments, cloud system 106 may include a server(s) and/or a database of information which is accessible over network 104. In some embodiments, a database 108 of cloud system 106 may store a dataset of data and metadata associated with local and/or network information related to a user(s) of the components of system 100 and/or each of the components of system 100 (e.g., UE 102 and the services and applications provided by cloud system 106 and/or device protection engine 200).

In some embodiments, for example, cloud system 106 can provide a private/proprietary management platform, whereby engine 200, discussed infra, corresponds to the novel functionality system 106 enables, hosts and provides to a network 104 and other devices/platforms operating thereon.

Figure 4:
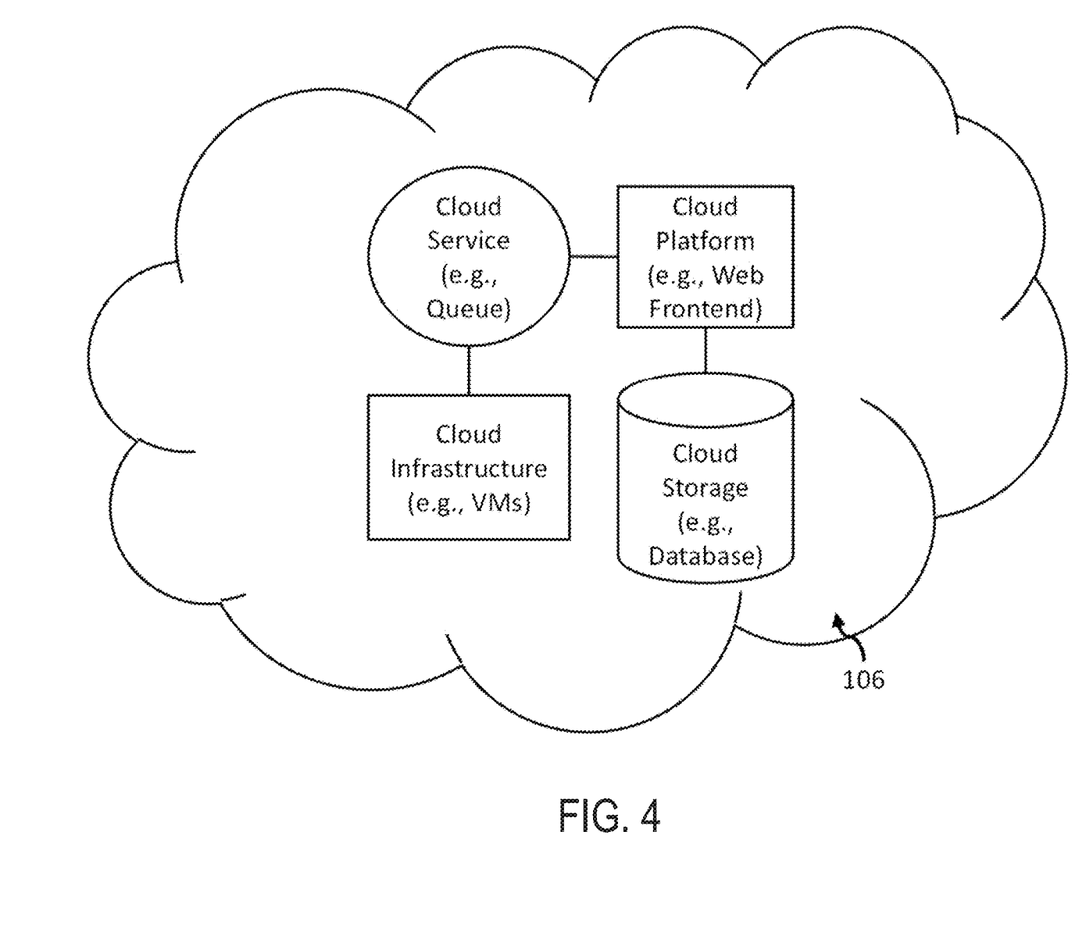
FIG. 4 depicts an exemplary implementation of an architecture according to some embodiments of the present disclosure.
Figure 5:
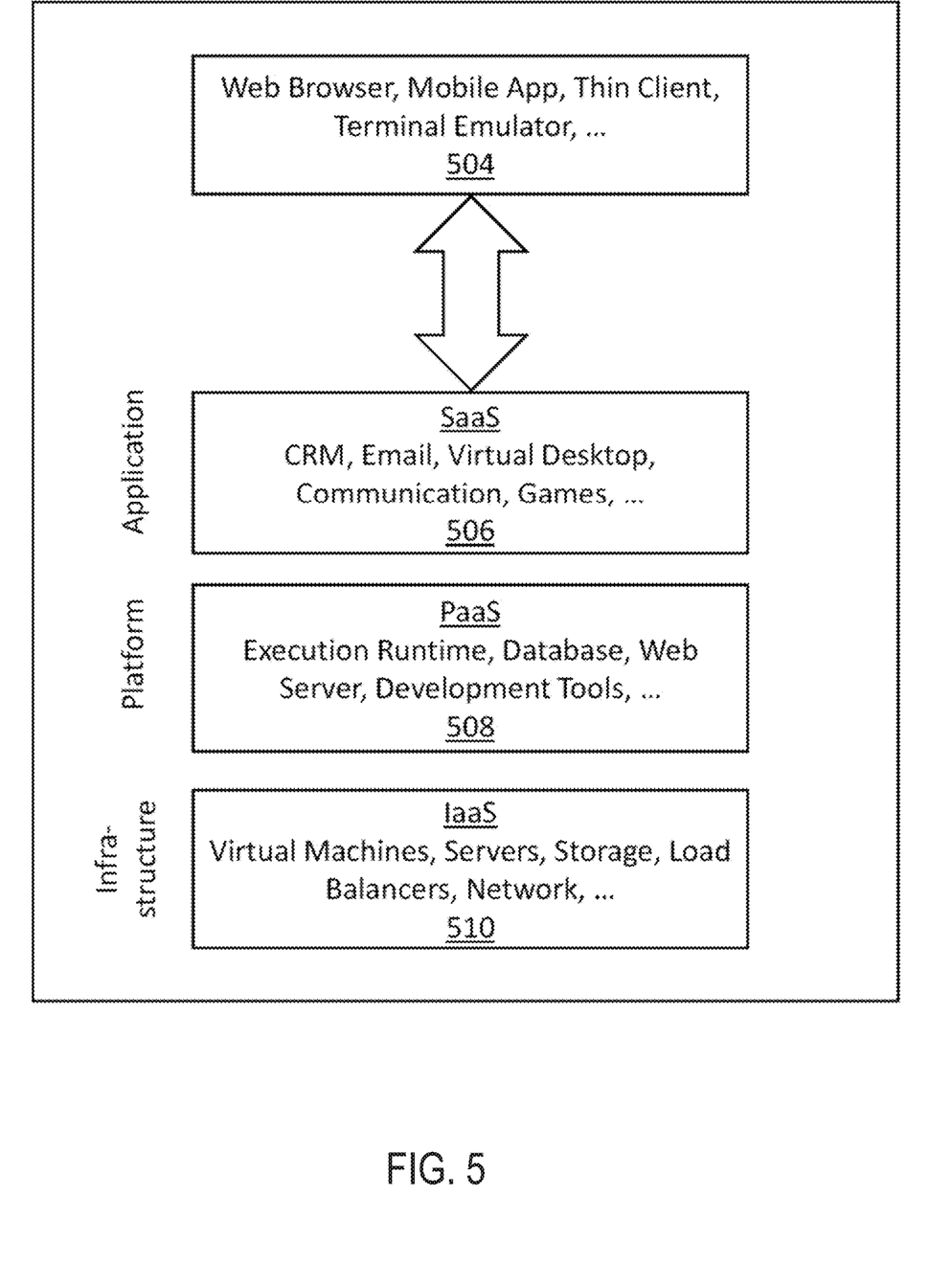
FIG. 5 depicts an exemplary implementation of an architecture according to some embodiments of the present disclosure.

Turning to FIGS. 4 and 5, in some embodiments, the exemplary computer-based systems/platforms, the exemplary computer-based devices, and/or the exemplary computer-based components of the present disclosure may be specifically configured to operate in a cloud computing/architecture 106 such as, but not limiting to: infrastructure as a service (IaaS) 510, platform as a service (PaaS) 508, and/or software as a service (SaaS) 506 using a web browser, mobile app, thin client, terminal emulator or other endpoint 504. FIGS. 4 and 5 illustrate schematics of non-limiting implementations of the cloud computing/architecture(s) in which the exemplary computer-based systems for administrative customizations and control of network-hosted application program interfaces (APIs) of the present disclosure may be specifically configured to operate.

Turning back to FIG. 1, according to some embodiments, database 108 may correspond to a data storage for a platform (e.g., a network hosted platform, such as cloud system 106, as discussed supra) or a plurality of platforms. Database 108 may receive storage instructions/requests from, for example, engine 200 (and associated microservices), which may be in any type of known or to be known format, such as, for example, standard query language (SQL). According to some embodiments, database 108 may correspond to any type of known or to be known storage, for example, a memory or memory stack of a device, a distributed ledger of a distributed network (e.g., blockchain, for example), a look-up table (LUT), and/or any other type of secure data repository Device protection engine 200, as discussed above and further below in more detail, can include components for the disclosed functionality. According to some embodiments, device protection engine 200 may be a special purpose machine or processor, and can be hosted by a device on network 104, within cloud system 106 and/or on UE 102. In some embodiments, engine 200 may be hosted by a server and/or set of servers associated with cloud system 106.

According to some embodiments, as discussed in more detail below, device protection engine 200 may be configured to implement and/or control a plurality of services and/or microservices, where each of the plurality of services/microservices are configured to execute a plurality of workflows associated with performing the disclosed device management. Non-limiting embodiments of such workflows are provided below in relation to at least FIG. 3.

According to some embodiments, as discussed above, device protection engine 200 may function as an application provided by cloud system 106. In some embodiments, engine 200 may function as an application installed on a server(s), network location and/or other type of network resource associated with system 106. In some embodiments, engine 200 may function as an application installed and/or executing on UE 102. In some embodiments, such application may be a web-based application accessed by UE 102 over network 104 from cloud system 106. In some embodiments, engine 200 may be configured and/or installed as an augmenting script, program or application (e.g., a plug-in or extension) to another application or program provided by cloud system 106 and/or executing on UE 102.

Figure 2:
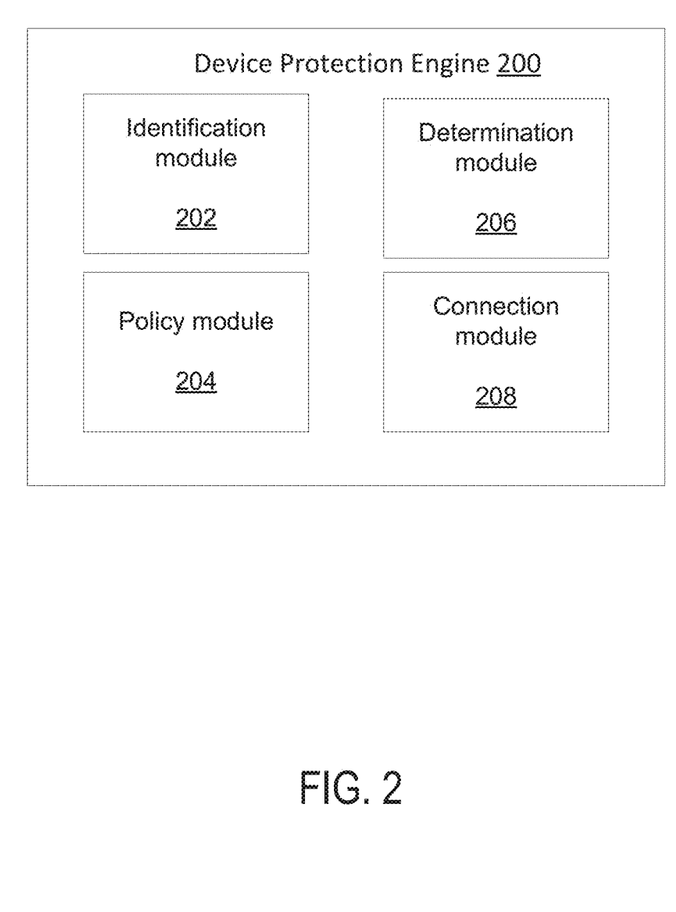
FIG. 2 is a block diagram illustrating components of an exemplary system according to some embodiments of the present disclosure.

As illustrated in FIG. 2, according to some embodiments, device protection engine 200 includes identification module 202, policy module 204, determination module 206 and connection module 208. It should be understood that the engine(s) and modules discussed herein are non-exhaustive, as additional or fewer engines and/or modules (or sub-modules) may be applicable to the embodiments of the systems and methods discussed. More detail of the operations, configurations and functionalities of engine 200 and each of its modules, and their role within embodiments of the present disclosure will be discussed below.

Figure 3:
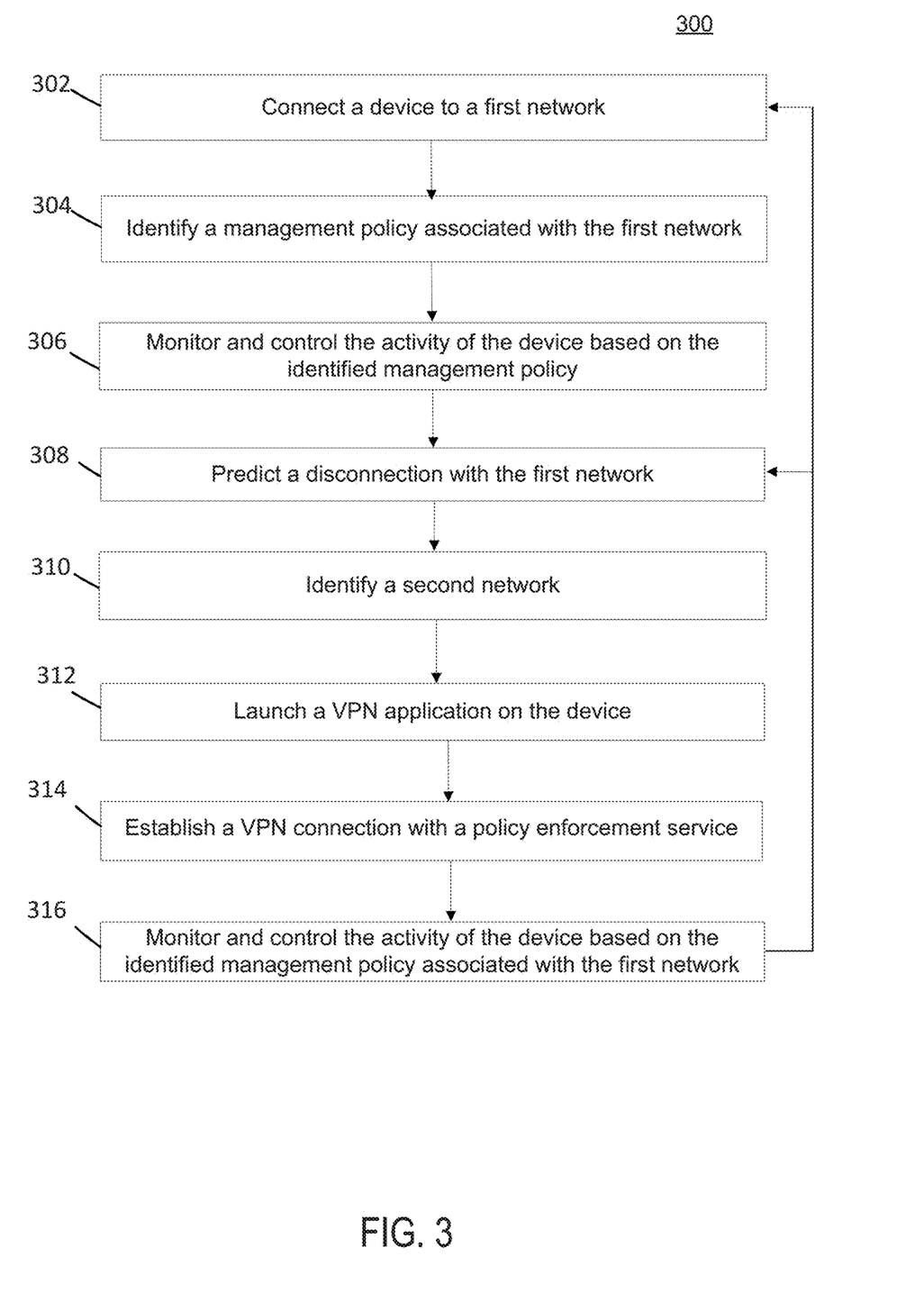
FIG. 3 illustrates an exemplary workflow according to some embodiments of the present disclosure.

Turning to FIG. 3, Process 300 provides non-limiting example embodiments for the disclosed device management framework. As discussed herein, the disclosed framework, via engine 200, can effectuate applications of device-control policies that can govern, dictate or otherwise provide read/write access to local and/or remotely accessible functionality by the device based on a network for which the device is currently connected.

According to some embodiments, Steps 302 and 312-314 of Process 300 can be performed by connection module 208 of device protection engine 200; Step 304 and 310 can be performed by identification module 202; Step 306 and 316 can be performed by policy module 204; and Step 308 can be performed by determination module 206.

According to some embodiments, Process 300 begins with Step 302 where engine 200 can identify a first network, whereby a device can connect thereto. It should be understood that while the discussion herein will be with reference to a single device, it should not be construed as limiting, as a plurality of devices can be discussed with reference to Process 300 without departing from the scope of the instant disclosure.

In some embodiments, the connection to the network can be, but is not limited to, automatic, based on device and/or user settings, in response to a request, based on another IoT device's connectivity, in accordance with an application's settings (e.g., HomePass™, for example) and the like, or some combination thereof. For example, Step 302 can involve a user device entering a user's home, whereby the device automatically connects to the home's Wi-Fi network.

In Step 304, engine 200 can identify a management policy associated with the first network. In some embodiments, the management policy can be configured as and/or stored as a data structure and/or executable file that can monitor, track and/or control network activities and/or traffic associated with user devices connected to the first network. In some embodiments, the management policy can be stored within cloud system 106, as discussed in more detail below. In some embodiments, the management policy can be provided to the first network and/or the devices operating therein and/or thereon (e.g., the devices providing the network and/or the devices connected to the network, for example) via cloud system 106. According to some embodiments, the management policy can be configured for and/or assigned to, but not limited to, the first network, an account of the first network, a location, a set of devices, a set of users and/or set of user accounts, types of activities, types of network resources, and the like, or some combination thereof.

According to some embodiments, the management policy can have associated user profiles which can include, but not be limited to, read/write access for certain devices and/or users. For example, user X can access applications X, Y and Z, whereas, user Y can only access applications X and Z. In another non-limiting example, the read/write access can further limit or throttle device bandwidth usage for certain users, devices, applications, time periods, and the like, or some combination thereof.

Accordingly, ins some embodiments, the management policy associated with the first network can provide network security and/or network traffic protocols and configurations, which can be based on information related to, but not limited to, demographics of users, types of applications, types of locations, a type of network, parameters of the network (e.g., bandwidth, latency, and the like, for example), time periods, user behaviors, user settings or preferences, device settings and/or preferences, and the like, or some combination thereof.

In some embodiments, the disclosed management policy can include elements related to, but not limited to, device identification, security measures, user access control, regular monitoring, policy enforcement, software updates, and the like.

In some embodiments, devices that connect to the first network can be identified and registered. In some embodiments, this can be performed through MAC or IP address filtering and/or by assigning unique usernames and passwords for each device.

In some embodiments, security measures can be provided that ensure that all devices connecting to the first network are secure and protected from unauthorized access. For example, this can be achieved by using strong passwords, enabling WPA2 encryption, and implementing firewalls, among other known or to be known security features.

In some embodiments, user access control can be provided to limit access to the first network based on user roles and responsibilities that can help ensure that only authorized users can connect to the first network. For example, this can be performed by creating user accounts with specific permissions.

In some embodiments, regular monitoring of the devices connected to the first network can help identify any unauthorized devices or potential security threats. For example, as discussed below, this can be performed through network monitoring software or by conducting regular security audits. In some embodiments, such monitoring can be performed periodically, based on event detection(s) and/or continuously.

In some embodiments, policy enforcement parameters can be set in order to have parameters for device usage and to enforce such policies consistently. For example, this can include, but is not limited to, restrictions on the types of devices that can connect to the network, limitations on data usage, guidelines for accessing sensitive information, and the like.

In some embodiments, regular, periodic, event based and/or interval-based software upgrades can be caused to be performed (e.g., automatically) devices that connect to the first network so as to ensure that the devices are secure and up-to-date with the latest security patches and updates.

As such, the disclosed management policy can prioritize security, user access control and policy enforcement to ensure that the devices operating on the first network, as well as the confines of the first network are secure, in addition to ensuring that all devices are authorized and monitored while they are connected.

In Step 306, engine 200 can effectuate operations to monitor and control the activity of the device based on the identified and applied management policy. As discussed above, such monitoring can be performed in accordance with a time period, continuously and/or upon detection of certain events (e.g., a type of request, detection of malicious activity, a type of application being launched on a connected device, a user login to a specific account, a quantity of data downloads, and the like).

Accordingly, in Step 306, engine 200 can control the activity of the device (e.g. that connected in Step 302), which can be effectuated via the management policy, as discussed above. In some embodiments, the activity can correspond to accessing and/or interacting with network resources, which can include, but are not limited to, an application, a web page, a portal, a network platform, an account, another user, and the like.

According to some embodiments, engine 200, via the management policy, can analyze the network traffic and/or network activities of the device, upon their request, initiation and/or attempted execution, and determine whether they comply with the management policy. In some embodiments, the determination of compliance can be according to a profile under the management policy, which can be for a user, device, application, and the like, or some combination thereof.

Accordingly, the monitoring and control of Step 306 can control device activity in various ways, including, for example, bandwidth management, time-based access controls, content filtering, user access controls, device blacklisting/whitelisting, network monitoring, and the like.

In some embodiments, bandwidth management policies can be implemented to control the amount of data that devices connected to the first network can transmit or receive. For example, this can provide protocols in situations where there are limited bandwidth resources or to prevent certain devices from monopolizing the network.

In some embodiments, time-based access controls can be used to limit when certain devices can access the first network. For example, access can be restricted during non-business hours or on weekends when the network is not in use.

In some embodiments, content filtering policies can be used to restrict access to certain types of websites or online content. For example, this can prevent users from accessing inappropriate or unauthorized content.

In some embodiments, user access controls can be used to limit what devices can access the first network based on user roles and responsibilities. For example, only authorized employees may be given access to the network while guests or visitors are limited to a separate guest network.

In some embodiments, blacklisting/whitelisting policies can be used to control which devices are allowed to connect to the first network. For example, this can be done by maintaining a list of approved or blocked devices based on MAC/IP addresses or other unique identifiers.

In some embodiments, network monitoring policies can be used to monitor device activity and identify any unauthorized or suspicious activity on the network. For example, this can be performed through network monitoring software or by conducting regular security audits, in a similar manner as discussed above.

According to some embodiments, the control of Step 306 can involve engine 200 implementing any type of known or to be known computational analysis technique, algorithm, mechanism or technology to analyze the monitored network data of the device.

In some embodiments, engine 200 may include a specific trained artificial intelligence/machine learning model (AI/ML), a particular machine learning model architecture, a particular machine learning model type (e.g., convolutional neural network (CNN), recurrent neural network (RNN), autoencoder, support vector machine (SVM), and the like), or any other suitable definition of a machine learning model or any suitable combination thereof.

In some embodiments, engine 200 may be configured to utilize one or more AI/ML techniques chosen from, but not limited to, computer vision, feature vector analysis, decision trees, boosting, support-vector machines, neural networks, nearest neighbor algorithms, Naive Bayes, bagging, random forests, logistic regression, and the like.

In some embodiments and, optionally, in combination of any embodiment described above or below, a neural network technique may be one of, without limitation, feedforward neural network, radial basis function network, recurrent neural network, convolutional network (e.g., U-net) or other suitable network. In some embodiments and, optionally, in combination of any embodiment described above or below, an implementation of Neural Network may be executed as follows:
   a. define Neural Network architecture/model,
   b. transfer the input data to the neural network model,
   c. train the model incrementally,
   d. determine the accuracy for a specific number of timesteps,
   e. apply the trained model to process the newly-received input data,
   f. optionally and in parallel, continue to train the trained model with a predetermined periodicity.

In some embodiments and, optionally, in combination of any embodiment described above or below, the trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the aggregation function may be a mathematical function that combines (e.g., sum, product, and the like) input signals to the node. In some embodiments and, optionally, in combination of any embodiment described above or below, an output of the aggregation function may be used as input to the activation function. In some embodiments and, optionally, in combination of any embodiment described above or below, the bias may be a constant value or function that may be used by the aggregation function and/or the activation function to make the node more or less likely to be activated.

Accordingly, in Step 306, engine 200 can leverage the management policy of the first network to control device activity by implementing policies that, among other parameters, limit bandwidth usage, restrict access to certain types of content, limit device access based on user roles and responsibilities, and monitor network activity to identify and prevent unauthorized activity.

In Step 308, engine 200 can determine or predict that the device is about to (or in some embodiments, has already) disconnected from the first network. In some embodiments, such prediction or determination can be based on an AI/ML analysis of the network data, as discussed above. For example, the network data indicates that the signal strength of the network is trending in a direction, at a rate below a threshold signal strength that corresponds to a viable signal strength for maintaining a connection with the first network. In another example, the location data (e.g., GPS data of the device) indicates that the device is exiting the location associated with the first network (e.g., leaving the home or has exited, and is moving out of range of the first network's signals).

In Step 310, based on the determination of the device's disconnection from the first network, engine 200 can identify a second network. In some embodiments, Step 310 can involve engine 200 causing the device to scan for available networks by sending out signals to nearby access points and/or towers. In response, the device can receive network information for each detected network, which can include, but is not limited to, a network name (e.g., service set identifier (SSID), signal strength, and other network parameters.

In some embodiments, the identified networks can be ranked, whereby the ranking can be based on, but not limited to, the signal strength of the network, type of network, location associated with the network, and the like. Thus, in some embodiments, the top ranked network can be automatically identified and/or selected; and in some embodiments, a subset of the ranking (e.g., top 3, for example) can be provided for selection by a user of the device. In some embodiments, the type of network can be any type of known or to be known wireless network (e.g., cellular or Wi-Fi network, for example).

By way of a non-limiting example, since the first network was a Wi-Fi network, and the user is determined to have left their home residence thereby physically moving beyond the reach of the first network, the second network may be a cellular network. For example, if the user's device is a smart phone, the device can identify the cellular network that the device is subscribed to.

In another non-limiting example, if the user exits her apartment, thereby disconnecting from their Wi-Fi network, but then enters her neighbor's apartment, the second network may be the Wi-Fi network for the neighbor's apartment. Thus, a variety of factors can contribute to the type of second network being identified, which as discussed above, can include, but are not limited to, movement of the user, a type of device, types of available networks, and the like.

In some embodiments, the identified network (e.g., the second network) can be associated with a same or different service provider of the first network.

In Step 312, upon identifying, and in some embodiments, selecting a second network (e.g., selecting the top ranked network, for example), engine 200 can cause a VPN (client) application to launch on the device. As discussed herein, the VPN application can effectuate a secure and private connection between the user's device and a policy enforcement service hosted and/or provided by cloud system 106. As discussed above, the management policy of the first network is enabled via cloud system 106, and as a result, cloud system 106 can implement a specifically configured policy enforcement service to enable the management policy to be applied to user and/or device activity when the device is operating externally from the first network. Thus, according to some embodiments, the VPN application enables the device to connect to the Internet via the second network, while the protocols and/or parameters of the management policy of the first network can be effectively applied via the cloud hosted policy management service.

In some embodiments, the VPN application can establish (or facilitate) a secure and encrypted connection between the second network and the cloud system 106, whereby network traffic and/or network data occurring on the second network can be managed and controlled via the management policy provided via the policy management service, in a similar manner as discussed above.

Accordingly, in Step 314, upon launching the VPN application in Step 312, engine 200 can establish the VPN connection to the cloud system 106 (that hosts/maintains the management policy for the first network). In some embodiments, this can involve obtaining VPN configuration information for the cloud system 106 (e.g., network location of the cloud system 106, username/password for authentication, a pointer to a network location and/or access to the management policy of the first network, and other settings for accessing the cloud system 106 and/or account of the first network from the policy enforcement service enabled via the cloud system 106), and configuring the connection settings of the VPN (client) application based on the configuration information. As such, the VPN connection can be effectuated via the configured connection settings, which can be performed according to known or to be known VPN functionality, as understood by those of skill in the art.

In Step 316, upon establishing the VPN connection with the policy management service of the cloud system 106 from the second network, the management policy of the first network can be activated (e.g., which can be automatically triggered via the connection of the device to the cloud system 106, as discussed above), which can be enabled via engine 200 to control the activities/data of the device on the second network. In some embodiments, activation of the management policy, as well as its implementation on the second network, are provided via the VPN application and VPN connection. In some embodiments, network data of the second network can be routed via the cloud system 106 for analysis based on the management policy. In some embodiments, network data can be analyzed on the second network via a session created in accordance with the management policy within the configured second network based on the configurations of the first network, as discussed above.

Thus, Step 316 can involve the performance of the monitoring and control, as discussed above in relation to at least Step 306, on the second network via the VPN connection in accordance with the management policy.

In some embodiments, network usage data as well as analytics from the monitoring and control occurring via the second network can be synchronized with the data and analytics of the first network. In some embodiments, such synchronization can be stored in database 108 and/or displayed within a user interface (UI), which can enable a user, engine 200 and/or administrator to review how the policy is being applied both in the first network and the second network. Accordingly, event detection as well as device operations can be reported and/or monitored between disparate networks.

In some embodiments, upon performing Step 316, engine 200 can recursively revert back to Steps 302 or Step 308. Step 302 can be performed when the device is predicted to return to the location for which the first network is associated, as discussed above, for example. Step 308 can be performed to determine when another network is to be identified due to the second network being disconnected or anticipated as being disconnected, as discussed above.

Figure 6:
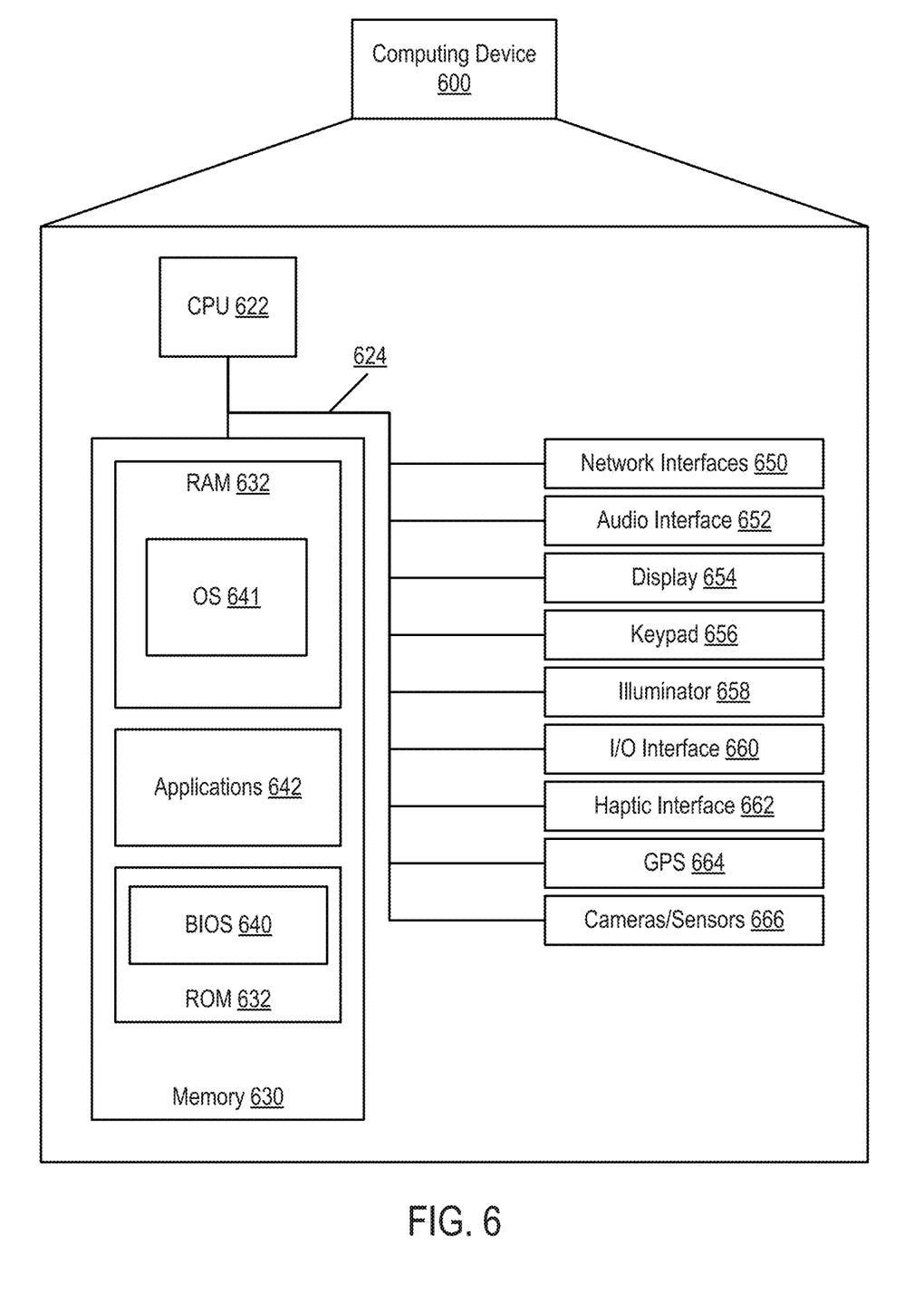
FIG. 6 is a block diagram illustrating a computing device showing an example of a client or server device used in various embodiments of the present disclosure.

FIG. 6 is a schematic diagram illustrating a client device showing an example embodiment of a client device that may be used within the present disclosure. Client device 600 may include many more or less components than those shown in FIG. 6. However, the components shown are sufficient to disclose an illustrative embodiment for implementing the present disclosure. Client device 600 may represent, for example, UE 102 discussed above at least in relation to FIG. 1.

As shown in the figure, in some embodiments, Client device 600 includes a processing unit (CPU) 622 in communication with a mass memory 630 via a bus 624. Client device 600 also includes a power supply 626, one or more network interfaces 650, an audio interface 652, a display 654, a keypad 656, an illuminator 658, an input/output interface 660, a haptic interface 662, an optional global positioning systems (GPS) receiver 664 and a camera(s) or other optical, thermal or electromagnetic sensors 666. Device 600 can include one camera/sensor 666, or a plurality of cameras/sensors 666, as understood by those of skill in the art. Power supply 626 provides power to Client device 600.

Client device 600 may optionally communicate with a base station (not shown), or directly with another computing device. In some embodiments, network interface 650 is sometimes known as a transceiver, transceiving device, or network interface card (NIC).

Audio interface 652 is arranged to produce and receive audio signals such as the sound of a human voice in some embodiments. Display 654 may be a liquid crystal display (LCD), gas plasma, light emitting diode (LED), or any other type of display used with a computing device. Display 654 may also include a touch sensitive screen arranged to receive input from an object such as a stylus or a digit from a human hand.

Keypad 656 may include any input device arranged to receive input from a user. Illuminator 658 may provide a status indication and/or provide light.

Client device 600 also includes input/output interface 660 for communicating with external. Input/output interface 660 can utilize one or more communication technologies, such as USB, infrared, Bluetooth™, or the like in some embodiments. Haptic interface 662 is arranged to provide tactile feedback to a user of the client device.

Optional GPS transceiver 664 can determine the physical coordinates of Client device 600 on the surface of the Earth, which typically outputs a location as latitude and longitude values. GPS transceiver 664 can also employ other geo-positioning mechanisms, including, but not limited to, tri-angulation, assisted GPS (AGPS), E-OTD, CI, SAI, ETA, BSS or the like, to further determine the physical location of client device 600 on the surface of the Earth. In one embodiment, however, Client device may through other components, provide other information that may be employed to determine a physical location of the device, including for example, a MAC address, Internet Protocol (IP) address, or the like.

Mass memory 630 includes a RAM 632, a ROM 634, and other storage means. Mass memory 630 illustrates another example of computer storage media for storage of information such as computer readable instructions, data structures, program modules or other data. Mass memory 630 stores a basic input/output system ("BIOS") 640 for controlling low-level operation of Client device 600. The mass memory also stores an operating system 641 for controlling the operation of Client device 600.

Memory 630 further includes one or more data stores, which can be utilized by Client device 600 to store, among other things, applications 642 and/or other information or data. For example, data stores may be employed to store information that describes various capabilities of Client device 600. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 600.

Applications 642 may include computer executable instructions which, when executed by Client device 600, transmit, receive, and/or otherwise process audio, video, images, and enable telecommunication with a server and/or another user of another client device. Applications 642 may further include a client that is configured to send, to receive, and/or to otherwise process gaming, goods/services and/or other forms of data, messages and content hosted and provided by the platform associated with engine 200 and its affiliates.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, and the like).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, API, instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, and the like).

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data. Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
  connecting, by a device, to a first network provided a service provider;
  implementing, by the device, a management policy associated with the first network, the management policy comprising executable instructions related to read/write access by the device to a network resource;
  controlling, by the device based on the implemented management policy, activity by the device on the first network;
  determining, by the device, to switch to a second network;
  executing, by the device, a virtual private network (VPN) application, the execution of the VPN application causing establishment of a VPN connection with the policy management service via the second network, wherein the VPN application enables the management policy of the first network to be applied to network activity by the device on the second network;

implementing, by the device, via the VPN connection, the management policy of the first network; and controlling, by the device, via the VPN application, the network activity of the device on the second network based on the read/write access of the management policy.

2. The method of claim 1, further comprising:

monitoring the activity on the first network;

analyzing the monitored activity; and determining, based on the analysis of the monitored activity, an indication that the device is to switch to the second network, wherein the determination to switch to the second network is based on the indication.

3. The method of claim 2, wherein the indication corresponds to an event related to at least one of a network outage, the device moving out of range of the first network, a signal strength of the first device falling below a threshold level and a selection made via the device.

4. The method of claim 1, wherein the management policy is managed by a policy management service provided by a cloud system, wherein the execution of the VPN application and the control, via the VPN of the network activity is controlled by the policy management service via the cloud system.

5. The method of claim 1, wherein the network resource corresponds to at least one of an application, a web page, a portal, a network platform and an account.

6. The method of claim 1, wherein the read/write access to the network resource is based on a network configuration related to allocated network parameters for the device.

7. The method of claim 1, wherein the second network is provided by the service provider.

8. The method of claim 1, wherein the second network is provided by a different service provider than the first network.

9. The method of claim 1, wherein the device is a user device.

10. The method of claim 1, wherein the first network is a Wi-Fi network associated with a location, wherein the second network is at least one of another Wi-Fi network and a cellular network.

11. A device comprising:

a processor configured to:

connect to a first network provided a service provider;

implement a management policy associated with the first network, the management policy comprising executable instructions related to read/write access by the device to a network resource;

control, based on the implemented management policy, activity by the device on the first network;

determine to switch to a second network;

execute a virtual private network (VPN) application, the execution of the VPN application causing establishment of a VPN connection with the policy management service via the second network, wherein the VPN application enables the management policy of the first network to be applied to network activity by the device on the second network;

implement, via the VPN connection, the management policy of the first network; and control, via the VPN application, the network activity of the device on the second network based on the read/write access of the management policy.

12. The device of claim 11, wherein the processor is further configured to:

monitor the activity on the first network;

analyze the monitored activity; and determine, based on the analysis of the monitored activity, an indication that the device is to switch to the second network, wherein the determination to switch to the second network is based on the indication, wherein the indication corresponds to an event related to at least one of a network outage, the device moving out of range of the first network, a signal strength of the first device falling below a threshold level and a selection made via the device.

13. The device of claim 11, wherein the management policy is managed by a policy management service provided by a cloud system, wherein the execution of the VPN application and the control, via the VPN of the network activity is controlled by the policy management service via the cloud system.

14. The device of claim 11, wherein the network resource corresponds to at least one of an application, a web page, a portal, a network platform and an account, wherein the read/write access to the network resource is based on a network configuration related to allocated network parameters for the device.

15. The device of claim 11, wherein the first network is a Wi-Fi network associated with a location, wherein the second network is at least one of another Wi-Fi network and a cellular network.

16. A non-transitory computer-readable storage medium tangibly encoded with computer-executable instructions that when executed by a device, perform a method comprising:

connecting, by the device, to a first network provided a service provider;

implementing, by the device, a management policy associated with the first network, the management policy comprising executable instructions related to read/write access by the device to a network resource;

controlling, by the device based on the implemented management policy, activity by the device on the first network;

determining, by the device, to switch to a second network;

executing, by the device, a virtual private network (VPN) application, the execution of the VPN application causing establishment of a VPN connection with the policy management service via the second network, wherein the VPN application enables the management policy of the first network to be applied to network activity by the device on the second network;

implementing, by the device, via the VPN connection, the management policy of the first network; and controlling, by the device, via the VPN application, the network activity of the device on the second network based on the read/write access of the management policy.

17. The non-transitory computer-readable storage medium of claim 16, further comprising:

monitoring the activity on the first network;

analyzing the monitored activity; and determining, based on the analysis of the monitored activity, an indication that the device is to switch to the second network, wherein the determination to switch to the second network is based on the indication, wherein the indication corresponds to an event related to at least one of a network outage, the device moving out of range of the first network, a signal strength of the first device falling below a threshold level and a selection made via the device.

18. The non-transitory computer-readable storage medium of claim 16, wherein the management policy is managed by a policy management service provided by a cloud system, wherein the execution of the VPN application and the control, via the VPN of the network activity is controlled by the policy management service via the cloud system.

19. The non-transitory computer-readable storage medium of claim 16, wherein the network resource corresponds to at least one of an application, a web page, a portal, a network platform and an account, wherein the read/write access to the network resource is based on a network configuration related to allocated network parameters for the device.

20. The non-transitory computer-readable storage medium of claim 16, wherein the first network is a Wi-Fi network associated with a location, wherein the second network is at least one of another Wi-Fi network and a cellular network.

* * * * *